United States Patent [19]
Chadha et al.

[11] 3,712,141
[45] Jan. 23, 1973

[54] DISPOSABLE THERMOMETER CONSTRUCTION

[75] Inventors: Desh D. Chadha, Caldwell; Babu B. Patel, Parsippany; Charles G. Pickett, Andover, all of N.J.

[73] Assignee: Bio-Medical Sciences, Inc., Fairfield, N.J.

[22] Filed: Oct. 14, 1971

[21] Appl. No.: 189,176

[52] U.S. Cl. ................. 73/356, 73/358, 116/114.5
[51] Int. Cl. ..................... G01k 11/08, G01k 11/12
[58] Field of Search .................. 73/358, 343 R, 356

[56] References Cited

UNITED STATES PATENTS

| | | | |
|---|---|---|---|
| 3,465,590 | 9/1969 | Kluth | 73/358 |
| 3,677,088 | 7/1972 | Lang | 73/356 |

Primary Examiner—S. Clement Swisher
Assistant Examiner—Denis E. Corr
Attorney—Elmer R. Helferich et al.

[57] ABSTRACT

A thermometer having a thermally sensitive substance deposited on a thermally conductive sheet, e.g., aluminum, and an overlying transparent film carrying indicator means which are superpositionably registerable with the thermally responsive substance for communicating therewith to denote specified temperatures upon change of state of the substance is provided with readily removable shield components associated, respectively with the thermally responsive substance, and the indicator means to protect the thermally responsive substance and indicator means from any adverse environmental conditions which would prohibit, alter or otherwise inhibit proper functioning of the thermometer when actually required for use. The shield component associated with the thermally responsive substance, is of substantially vapor impervious character and comprises a material which is nonreactive with the thermally responsive substance heat sealable to the thermally conductive sheet and so sealed in face-to-face contact to the thermally conductive sheet in covering position over the thermally responsive substance deposits. Such shield component preferably is a two-layer laminate comprised of an ionomer layer selected for its amenability for heat sealing to metal foil, and a vapor-barrier reinforcing layer of a material such as aluminum, polyester or nylon overlaying the ionomer layer and in intimate contact therewith. The other shield component, i.e., associated with the indicator means, is readily removably adhesively secured to the transparent film. Both shield components can be peelably removed from the thermometer by pulling action applied digitally to pull tab means on the shield components. Concurrent with the peeling of the shield components from the transparent film and thermally conductive sheet when rendering to thermometer operative for use, the former is pressed against the thermally conductive sheet to position the indicator means in proper overlying communicating registration with the temperature responsive substance.

27 Claims, 6 Drawing Figures

PATENTED JAN 23 1973

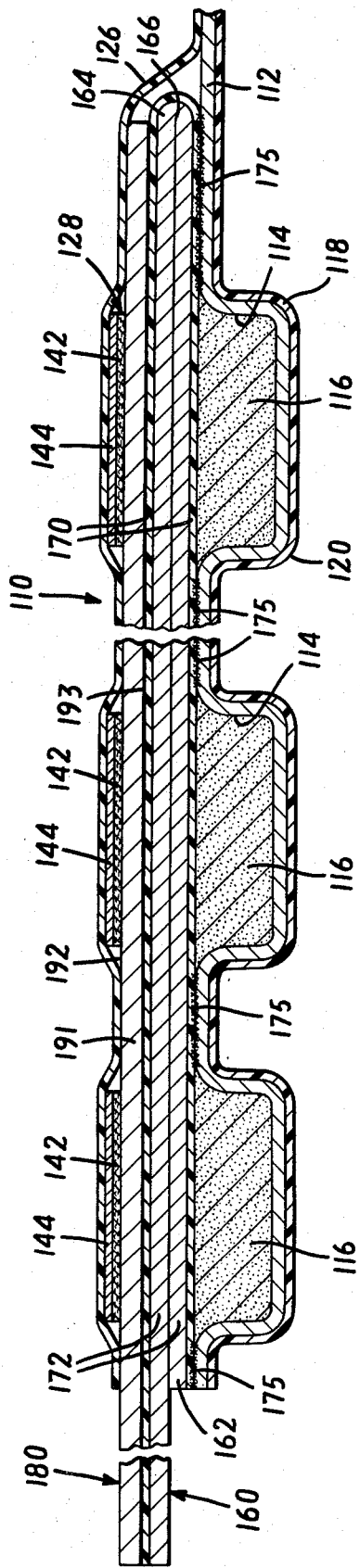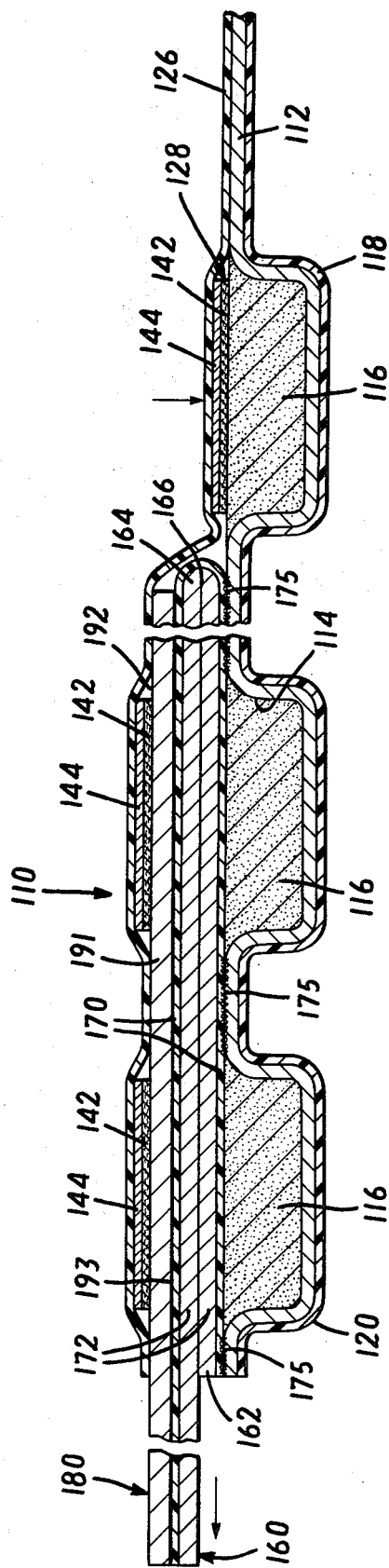

3,712,141

DISPOSABLE THERMOMETER CONSTRUCTION

BACKGROUND OF THE INVENTION

Temperature indicating devices, i.e., thermometers utilizing a thermally responsive substance which responsive to temperature change in a test subject, undergoes a change of state which state change is manifested in suitable indicator means to indicate a precise temperature, are known. One such form of thermometer is disclosed in pending Application Ser. No. 058,001 filed July 24, 1970 now U.S. Pat. No. 3,665,770. Particular forms of thermally responsive substance suited for use in the thermometer are described in pending application Ser. No. 120,998 filed Mar. 4, 1971.

The thermometer type described in the aforementioned patent applications is comprised of a thermally conductive sheet, e.g., a foil of aluminum in which is formed a number of cavities, each being filled with a thermally responsive substance provided in such quantity and/or composition as permits for change of the substance from solid to liquid state in graduated sequence responsive to the temperature of the subject being tested, one such substance being, e.g., a solid solution comprised of ortho-chloronitrobenzene and ortho-bromonitrobenzene. Also provide in that thermometer is an indicator means in suitable form, such as a dyestuff, which upon melting of the thermally responsive substance in the respective cavities cooperates with an acceptor as by migration thereto, to indicate visually by change of color of the acceptor a precise condition of temperature associated with each cavity. Application Ser. No. 120,995 filed Mar. 4, 1971 now U.S. Pat. No. 3677088 describes a separator shield for embodiment in the thermometer which during the manufacture of the thermometer is removably inserted between the thermally responsive substance and the indicator means to bar communication therebetween until the thermometer actually is to be used. Such shield is provided as a flexible strip of material, e.g., a coated aluminum foil, which is folded back upon itself to form at least two portions thereof which are positioned with the first portion overlying but unsecured to the thermally responsive substance carrying indicator section of the carrier sheet, the remaining length of the carrier sheet comprising a handle section thereof. The second portion is positioned coextensive with and removably adhered to the indicator means carrying indicator section of the transparent film, the remaining length of the transparent film likewise comprising a handle section thereof. Removal means, e.g., a pull tab is provided on the shield to facilitate its removal from the thermometer preliminary to using the latter. By holding the tab and pulling on the other end of the thermometer, or vice versa, the shield is caused to peel away from the underface of the transparent film to which it is secured in a direction away from the handle section of such film without affecting the positioning or securement of the indicator means to such surface. The transparent film at the temperature indicating end can then be pressed into registering superpositioned contact with the thermally conductive sheet thereby establishing communication between the temperature responsive substance and the indicator means and rendering the thermometer operative for its intended purpose. Such thermometer and the separator shield is quite suited for its intended purpose. However, the shield thus described only overlays the thermally responsive substance and, accordingly, does not positively bar ingress or egress access to the thermally responsive substance filled cavities. Thus, certain environmental conditions such as temperature and/or humidity could during storage cause chemical or physical alteration of the thermally responsive substance thereby changing composition concentration and/or quantity sufficiently to render the thermometer inoperative or inaccurate. To provide enhanced storage or shelf life protection for the thermometer before use, it is desirable that a more positive protection for the thermally responsive substance deposited in the thermally conductive sheet be provided to prevent ingress or egress access to such substance before such time as the thermometer is to be used. Such means or protection is provided in a manner which establishes a vapor impervious barrier between the thermally responsive substance and the ambient environment and insures that the chemical and physical character of the thermally responsive substance is unaffected by any ambient condition to which the thermometer may be exposed during storage prior to use. For example, storage in a cabinet where temperatures may exceed the operating temperature range of the thermally responsive substance and which cause a state change from solid to liquid is not detrimental to proper functioning of the thermometer since the sealed shield component prevents escape of the substance as a liquid or a vapor thereof from the cavities. Furthermore, the shield prevents loss by sublimation of any significant portion of the thermally responsive substance over prolonged periods for as long as six months or more. Further, the establishment of a vapor barrier by means of a shield component as aforesaid prevents incursion of moisture or other vapor agency to the cavities which if such occurred could alter the precise temperature at which the deposited substance is intended to melt.

SUMMARY OF THE INVENTION

The present invention is concerned with improvements in temperature indicating devices and, more specifically, improvements in disposable-type thermometers such as those described in the earlier-mentioned pending United States applications. It is an important object of the present invention to provide shield components for maintaining the indicator means and the thermally responsive substance in such type of thermometer isolated or sealed from adverse environmental conditions and from each other until the thermometer is actually required for use, such being accomplished in a manner that measurably prolongs the shelf life of the thermometer. The principal protective aim concerns isolating the thermally responsive substance in the thermometer with a shield component which is secured to the indicator section of the thermally conductive sheet in covering position over the thermally responsive substance filled cavities formed in such thermally conductive sheet. Preferably the shield component comprises a two-layer laminate including a first film layer of a polymeric material amenable to heat-sealing to metal foils, e.g., the aluminum foil from which the thermally conductive sheet is made and also being inert in respect of or non-reactive with the thermally responsive substance deposited in the thermally conductive sheet. For such purposes, anionic polymeric materials, i.e., polymer materials rendered anionic by the polymerization process employed are used and can include ionomers and polyethylene. To provide the shield component with enhanced vapor impervious character, the second layer of the laminate can be comprised of a sheet of aluminum or nylon or a polyester which is joined in intimate contact with the first layer, e.g., by being laminated to the first layer. In general and if aluminum is being used for the second layer, it should have a sheet thickness of 1 ½ to 2 mils or more to insure its vapor impervious character and absence of pinholes in the sheet structure. The shield component is made such that when embodied in a thermometer it is folded back upon itself to form at least two portions, one of which is coextensive with and is heat-sealed in readily removable connection to a face portion of the indicator section of the thermally conductive sheet in a heat seal course encircling at least the entrance to each cavity in the thermally conductive sheet, and a second portion which is folded against the first portion and is provided with pull tab means for initiating peeling removal of the first shield component from the thermally conductive sheet preliminary to using the thermometer. Another shield component and associated with the indicator means for covering same may be provided and can comprise an elongated strip of a suitable material, for example, a fluorocarbon sheet or a silicone release paper which is adhesively secured along a length thereof to the adhesive face of the transparent film carrying the temperature indicator means, such sheet being folded like the first-mentioned shield component back upon itself to form at least two portions, one of which is secured as described aforesaid and the second of which is folded against the first portion and which also is provided with pull tab with which peeling of said other shield component from the transparent film indicator section is initiated.

Removal of the shield components from the thermometer preliminary to using the same can be effected in the manner described in the pending application Ser. No. 120,995, i.e., removal is effected with a digitally applied force to peel away the respective shield components in a fashion similar to that depicted in FIGS. 3 and 4 of said pending application Ser. No. 120,995, the peeling action being effected concurrently to both shield components. Following removal of the shield components, the transparent film carrying the indicator means is pressed against the thermally conductive sheet to bring the indicator means and thermally responsive substance into operative association.

A further form of shield components can be embodied in the thermometer in which a shield component associated with the thermally responsive substance is provided and is comprised of the same materials and constructed in the manner as above described. Another shield component which is associated with the indicator means is provided and comprises a strip of suitable material such as paper having opposite faces. The paper strip is connected at one face in heat sealed contact with the first-mentioned shield component and the other face is juxtaposed with the indicator means and the adhesive face on which the latter are carried. Such other face of the paper strip is treated with and has thereon a release agent coating such as silicone. In this form of shield components arrangement, the first-mentioned shield component is peeled off the thermally conductive sheet while the other shield component is slid across the indicator means and adhesive face of the film support on which they are carried such sliding movement being possible due to the presence of the release agent on said other shield component.

The invention accordingly comprises the improved thermometer possessing the features, properties and relation of elements which will be exemplified in the device hereinafter described and the scope of the invention will be indicated in the claims.

BRIEF DESCRIPTION OF THE DRAWINGS

Other objects of the invention will be in part obvious and will in part appear from the following detailed description taken in conjunction with the accompanying drawings, wherein like reference numerals identify like parts throughout and in which:

FIG. 5 is a longitudinal vertical sectional view of the indicating end of a thermometer embodying a modified arrangement of shield components.

FIG. 6 is the same as FIG. 5 except it shows the position of the shield components at an intermediate position of removal of the same.

DESCRIPTION OF THE PREFERRED EMBODIMENTS

Figure 1:
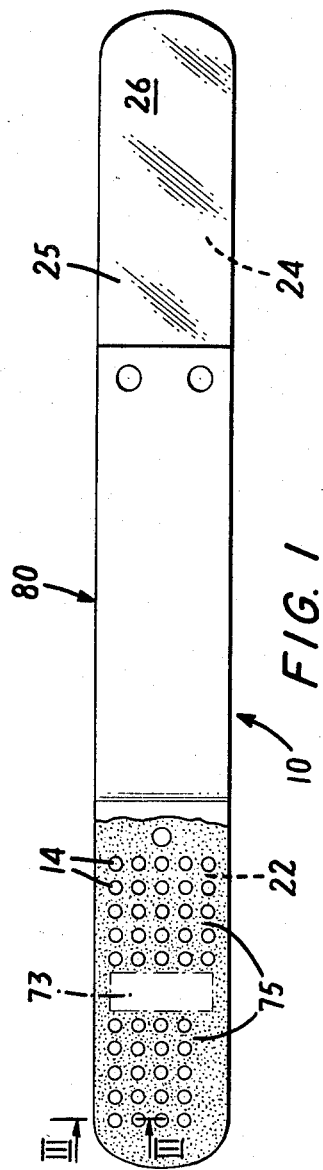
FIG. 1 is a plan view of a thermometer constructed in accordance with the principles of the present invention and embodying shield components therein which are interposed between the thermally conductive sheet carrying the thermally responsive substance, and the transparent film on which is carried the indicator means to maintain the two isolated or sealed from storage environmental influences until the thermometer is ready for use, substantially all of the shield component which is heat-sealed to the thermally conductive sheet being removed to depict the pattern of expanse in which such shield component is heat-sealed to the indicator section of the thermally conductive sheet such expanse being depicted by means of stippling, the other shield component and the indicator section of the transparent film being folded backward longitudinally along the body of the thermometer.

The present invention is concerned with an improved form of thermometer and particularly one which embodies improved means for shielding both the indicator means and the thermally responsive substance from direct contact with inimical environmental conditions such as temperature and humidity until such time as the thermometer is required for use. Such means preferably is provided in a form which is readily removable, e.g., by peeling at the time of use with a digitally applied force. The general construction and function of such type of thermometer is, as indicated earlier, described in detail in pending applications Ser. Nos. 058,001 filed July 24, 1970; 102,998 filed Mar. 4, 1971; and 120,995 filed Mar. 4, 1971, and reference is made to the disclosures of the aforesaid patent applications for such purposes of description.

Referring now to FIGS. 1–4, thermometer 10 is comprised of a thermally conductive sheet 12 in which is depressed or otherwise formed, a plurality of cup-shaped cavities 14, the cavities being provided in such numbers as may be required to provide a reasonable range of temperature indication depending on the subject for which the thermometer is to be used. A printing of indicia (not shown) also can be provided on the carrier sheet to denote specific temperature values. Sheet 12 conveniently is provided as a sheet or strip of a good thermally conductive material such as a foil of a metal, e.g., an aluminum foil which has a certain strength and which is a good thermally conductive material for enhancing transmission of heat to the thermally responsive substance 16 deposited in each cavity 14. The thermally responsive substance 16 can be a chemical system suited for the intended purpose, e.g., one of the compositions described in applications Ser. Nos. 058,001 and 120,998, a solid solution of ortho-chloronitrobenzene and ortho-bromonitrobenzene being especially suitable for clinical testing purposes. As can be noted from FIGS. 1 and 4 the thermally conductive sheet 12 has a first longitudinal portion shown generally at 22 which defines or provides an indicator section for such sheet serving as a reception area for the thermally responsive substance 16 and its upper surface preferably being planar with the entrances to the respective cavities 14 lying in such plane, the remaining longitudinal portion shown generally at 24 providing a handle section.

To increase the overall strength of the thermally conductive sheet 12 and to prevent accidental puncture of the cavities 14 as when the thermometer is received in a human test subject's mouth and thereby preclude mouth contact with the thermally responsive substance 14, the thermally conductive sheet 12 can be provided at the face thereof opposite that on which the thermally responsive substance is deposited, with a layer 18 or coating of a suitable material such as any polymeric coating material, the layer 18 being coextensive with the sheet 12 and being affixed thereto in any suitable manner such as be extrusion coating, the layer 18 conformally contouring as at 20 with the cup-shaped cavities 14.

Overlying the thermally conductive sheet 12 and of coextensive character therewith is a preferably transparent film 26 of polymeric material which like layer 18 can be a polymeric material such as Mylar or polypropylene and which provides a support for indicator means shown generally at 28. Transparent film 26 also has portions thereof defining an indicator section 23 and a handle section 25 corresponding in expanse with indicator section 22 and handle section 24, respectively, of the thermally conductive sheet 12. The underface of transparent film 26 is provided with an adhesive coating (not illustrated), such adhesive being generally a pressure sensitive type as which will permit peelable removal therefrom of a shield component adhesively secured thereto in a manner to be described later, as well as maintain adhesive securement together of the thermally conductive sheet and transparent film of the thermometer when in use. Such adhesive should be inert respecting the thermally responsive substance 14 so as to not affect its operative functioning. The handle section 25 of the transparent film 26 is adhesively secured in face-to-face contact with the corresponding section 24 of the thermally conductive sheet 12 and remains in that arrangement permanently following manufacture of the thermometer. The other or indicator section 23 of the transparent film 26, as mentioned earlier, provides a support for carrying the indicator means 28 which means can be provided as a plurality of indicator components, e.g., a matrix of paper dots adhered to the surface of transparent film 26 in number and positioning in correspondence to the arrangement of cavities 14 in the sheet 12. The indicator means can, for example, comprise a dyestuff 42 painted as a coating on the surface of an acceptor 44, the dyestuff upon wetting of the same by a change in state of thermally responsive substance 16 migrating to the acceptor and providing visual evidence of a recorded temperature value. With the transparent film 26 pressed down in the position shown in FIGS. 2 and 3, and also following removal of the after-described shield components, each of the indicator means 28 lies disposed superpositioned registrably with one of the cavities 14.

The improvement provided by the present invention for enhancing the shelf life of the thermometer 10 until it is actually required for use on a test subject is provided by employment of shield components 60 and 80 interposed between the thermally responsive substance 14 and the indicator means 28 to completely isolate such elements from adverse environmental conditions during storage and thereby prolong shelf life without effecting constancy or accuracy of the thermometer when used. A particular description of the shield component 60 which is used in association with the thermally responsive substance will be given next.

The first shield component 60 which is associated with the thermally responsive substance 16 and which is used to isolate the thermally responsive substance deposited the cavities 14, from all ambient influence until the thermometer is ready to be used in comprised of a first portion 62 which is coextensive with the indicator section 22 of the thermally conductive sheet 12, and a second portion 64 folded back upon the first 62 along a fold line 66 and which second portion terminates with an outwardly extending third portion 68 constituting pull tab means used to initiate removal of the shield component 60 in concurrent peeling removal with shield component 80 at the time the thermometer is required for use. To properly protect the thermally responsive substance and to allow for the heat-sealing of the first shield component 60 to the planar face of the indicator section 22 of the thermally conductive sheet 16, it is necessary that a selected material be used for such component. Where a metal foil such as aluminum foil is used as the thermally conductive sheet 12, a material which is compatible with aluminum for the purposes of heat-sealing such material to the aluminum and which material is non-reactive with the thermally responsive substance must be used. For heat sealing to a metal foil, a polymer material which by the polymerization process by which it is produced is rendered anionic is employed. Themoplastic materials such as ionomers and polyethylene are suited for this purpose and provide for optimal heat sealing to aluminum foil. However, since such materials do not of themselves possess in thin films thereof a high order of vapor imperviousness, a second material such as aluminum, a polyester, or nylon is employed to provide such property to the shield component and accordingly, shield component 60 is made as a two-layer laminate comprised of a first layer 70 of an anionic polymer and a second layer 72 of aluminum or the like in intimate contact with the first layer such laminate being produced in any convenient manner, as for example, by extrusion.

Figure 2:
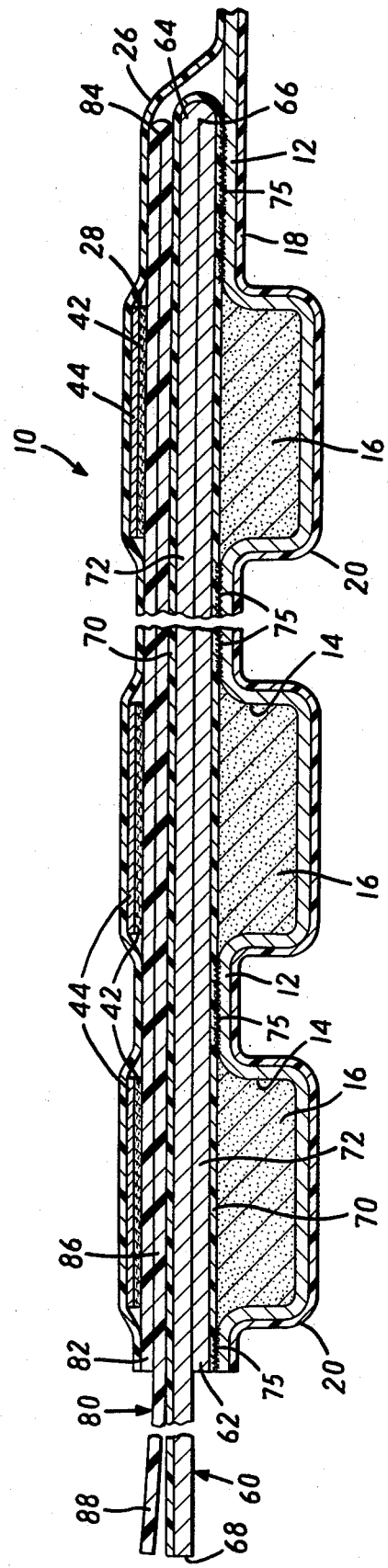
FIG. 2 is a vertical longitudinal sectional view on enlarged scale of the indicating end of the thermometer showing the manner in which the shield components are embodied therein, the pull tab means of the shield components being shown extending longitudinally a distance beyond the end of the thermometer in which position they are disposed as a preliminary to peelably removing the shield components from the thermometer therewith.
Figure 3:
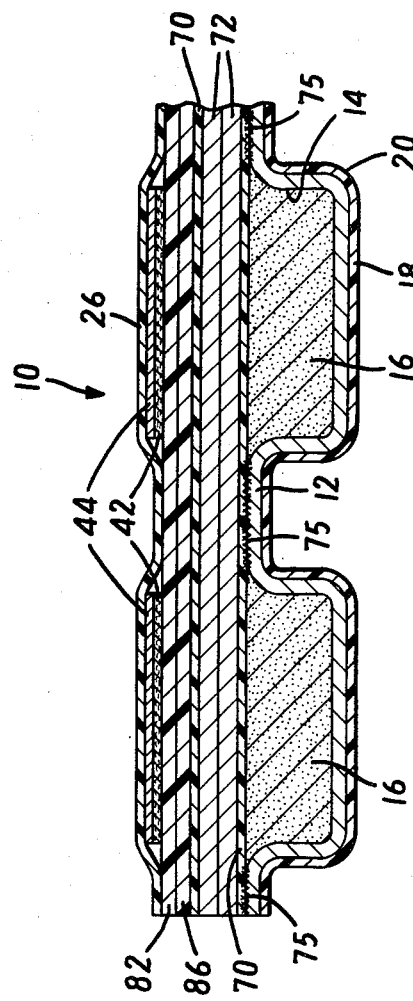
FIG. 3 is a transverse fragmentary sectional view on enlarged scale of the thermometer illustrated in FIGS. 1 and 2 depicting the manner in which the shield component associated with the thermally responsive substance is connected in heat-sealed face-to-face contact with the thermally conductive sheet in an encircling course around the entrance of each depressed cavity in the latter.

As can be seen in FIGS. 2 and 3, the first shield component 60 is heat-sealed to the planar face of indicator section 22 of the thermally conductive sheet 12 in a course at least encircling the entrance to the respective cavities 14 but preferably in substantially face-to-face contact therewith as indicated by the stippling in FIG. 1 so that when the shield component is in place on the indicator section of the thermally conductive sheet, the thermally responsive substance in each cavity is completely isolated from the outside environment as well as the thermally responsive substance in any other one of the cavities 14 and there is effectively barred any ingress or egress access to the cavities 14. The pattern of heat seal as indicated at 75 preferably is substantially full face-to-face except that a central portion as at 73 may be left unsealed to facilitate peeling removal of the shield component. Desirably, the heat seal connection of shield component 60 is effected such that the connection is contiguous around the surface of the indicator section 22 of thermally conductive sheet except for portion 73 while at the same time such bond or connection is readily rupturable for removal of the shield component. Further, the compatibility of the anionic polymer with the metal foil of sheet 12 is such that the shield component 60 can be removed from its heat sealed connection with indicator section 22 without leaving any residue therefrom on the indicator section.

Shield component 60 can be heat-sealed to the thermally conductive sheet 12 in any suitable manner as, for example, by employing a heated flat surface as a die element and supporting the thermometer on an anvil with the depressions of the cavities 14 locating in companion depressions in the anvil and then applying heat and pressure with the die element to melt the anionic polymer layer and effect a heat-seal of the same to the aluminum of the thermally conductive sheet. Using an anvil with depressions therein for receiving cavities 14 insures only land-to-land contact of the die with the indicator section 22 and thus avoids any force out or spillage of thermally responsive substance from the cavities during the heat seal operation. An advantage of using aluminum as the material in laminate second layer 72 is that the same facilitates heat transfer from the die element through the shield component to the anionic polymer layer. In effecting the heat seal, the indicating end of the thermometer is opened and the second fold portion 64 of the shield component is swung clear so that the die contacts only the foil layer 72 of the component portion 62. Other forms of effecting the heat-seal can be employed such as first applying a pressure with the die to secure a connection of the polymer with the aluminum sheet 16, and then applying heat to effect fusion of the anionic polymer to the aluminum. The degree of seal possible when using an anionic polymer — aluminum laminate is such as to prevent the ingress of any vapor to the temperature indicating section of the thermally conductive sheet such as would alter the characteristics of the thermally responsive substance in the cavities therein or egress as would permit any significant sublimation thereof.

To further protect the thermometer, another shield component 80 associated with the indicator means is provided being formed of a flexible sheet of a polymeric material such as a fluorocarbon material, polytetrafluoroethylene being especially suited for this purpose. A release agent treated paper also can be used. As seen in FIG. 2, the shield 80 is formed such that it is folded upon itself in at least one fold along a fold line 84 located adjacent the junction of the transparent film indicator and handle sections to provide a first portion 82 thereof generally coextensive with the indicator section 23 of the transparent film 26 and which is adhesively secured to the underface of such indicator section thus covering the respective indicator means 28 thereon, and an underlying similarly coextensive second portion 86. The adhesive bond between the first portion 82 of the shield component and the transparent film provided by the adhesive face of the latter is not such as removal of the shield in a manner to be described later will induce or promote stretching of the transparent film 26 which would prevent achieving proper registration of the indicator means with thermally responsive substance after the transparent film is pressed against the thermally conductive sheet following removal of the shield component 80. Shield component second portion 86 which as shown in FIG. 2 is folded under the first portion, terminates in a third portion 88 of the shield component and provides pull tab means for digitally initiating removal of the shield from the operative position it has in the thermometer as shown in FIG. 2. The second shield component material should of course be non-reactive with the dyestuff 42 in the indicator means 28 and be readily peelably removable from the adhesive face of film 26.

Figure 4:
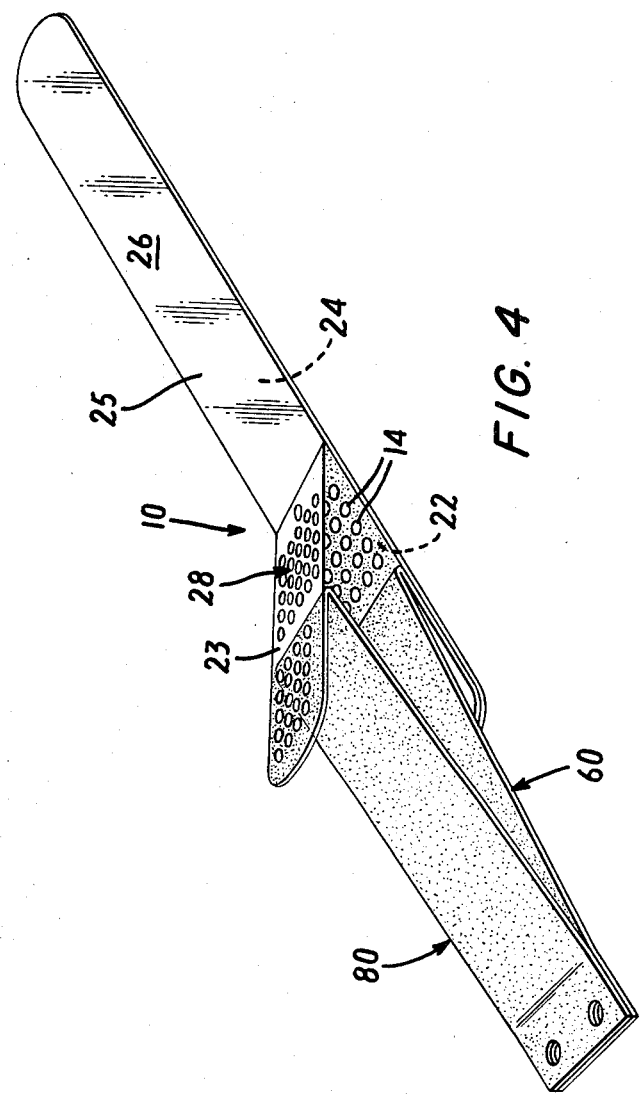
FIG. 4 is a perspective view of the thermometer shown in FIGS. 1—3 depicting the manner in which the shield components are peelably removed from the thermometer preliminary to using the same, the shield components being shown in an intermediate position of removal.

The thermometer 10 prior to use normally is not operative to record a temperature value. If it is desired to use the temperature on a test subject and thus render it operative, such change can be accomplished most expeditiously and conveniently. The manner of removal of the first and second shield components 60 and 80 from the thermometer is effected in the same way as described for the shield used in the thermometer in the aforementioned application Ser. No. 120,995. Accordingly, in removing the shield components 60 and 80, the user initiates the same by applying a pulling force preferably concurrently to the pull tabs means of the respective shield components while holding the thermometer near the juncture of the respective indicator sections and the handle sections of the thermally conductive sheet and transparent film or by holding the pull tabs and applying a pulling force to the thermometer to pull the shield components in a direction away from the handle section of the thermometer. The application of a pulling force of moderate magnitude is effective to initiate peeling of the second shield component 80 from the underface of the transparent film indicator section starting at the fold line 84 as well as to initiate a braking of the heat-seal bond between the first shield component 60 and the thermally conductive sheet 12 at the fold line 66. An intermediate position of removal of the shield components is shown in FIG. 4 which clearly depicts the principles attending shield removal described above.

The thermometer 10 provided with shield components 60 and 80 in accordance with the present invention, can be packaged in a dispensing device of the type described in the pending application Ser. No. 120,997 filed on Mar. 4, 1971 in which the respective thermometers are secured to a carrier tape and dispensed from the device by pulling the tape outwardly through an opening in the device, the shield components being staked in an anchorage in a manner similar to that as described in said patent application and being peelably removed within the device upon withdrawal of the thermometer therefrom.

A modified form shield components which can be embodied in a thermometer in conjunction with the thermally responsive substance and indicator means is depicted in FIGS. 5 and 6. The thermometer 110 shown in FIGS. 5 and 6 is the same as the thermometer 10 earlier described. It includes substantially all of the same components as described in connection with thermometer 10 with the corresponding components of thermometer 110 being prefaced with the additional reference number 1. The shield component 160 which is heat sealed to the thermally conductive sheet 112 is as shown in FIG. 5 and is the same as shield component 60 described in connection with thermometer 10. However, the shield component 180 associated with the indicator means differs from that earlier described in that it is comprised of a single layer 191 of a suitable paper material having opposed faces and which is connected in heat seal connection at one face as at 193 with the anionic polymer layer of the second portion 164 of shield component 160. In this manner, the shield component 180 is permanently secured to the shield component 160 so that removal of the latter will automatically result in removal of the shield component associated with the indicator means Shield component 180 is a single layer component and does not peel away from the underface or adhesive coated face of the film support 126. Rather, the same is slid outwardly of the thermometer indicating section and to facilitate such sliding removal passage of the shield component 180 the upper or other face surface thereof which is juxtaposed with the indicator means and adhesive face of film support 126 as at 192 is coated with a suitable release agent such as a silicone material. The utilization of a release coating on the upper surface of the shield component 180 where it is juxtaposed with the indicating section of the film support 126 effectively inhibits any adhesion between the shield component 180 and the film support so that removal of the shield component 180 can be achieved without causing any disturbance to or alteration in the positioning of the indicator means 128 adhered to the adhesive face of the films at 126. The removal of the shield components 160 and 180 from the thermometer 110 involves applying a pulling force to the shield component 160. Since the shield component 180 is permanently connected to component 160, the peeling away of the shield component 160 accompanied by the rupture of the heat seal connection 175 of the latter with the thermally conductive sheet 160 will slidably displace the shield component 180 within the indicating section end of the thermometer in the manner depicted in FIG. 6.

It will be apparent from a reading of the foregoing that the improvement to disposable thermometers provided by the present invention is particularly advantageous in that it insures optimum protection of both the indicator means and the thermally responsive substance in the thermometer until the thermometer is required for use by maintaining them effectively isolated from the effects of any adverse environmental conditions to which the thermometers may be exposed during storage.

What is claimed is:

1. In a temperature indicating device comprising an elongated thermally conductive sheet having a face portion thereon defining an indicator section, there being at least one shaped cavity depressed in said indicator section away from said face portion, a thermally responsive substance deposited on said thermally conductive sheet within said cavity, said substance being amenable to change of state at a predetermined temperature, a shield component comprising a material strip which is vapor impervious, inert in respect of said thermally responsive substance and heat sealable to said thermally conductive sheet disposed on and removably connected in heat-sealed contact with the indicator section face portion of said thermally conductive sheet in a course at least encircling the entrance to said cavity, said shield component embodying pull tab means for digitally peelably removing said shield component from said indicator section of said thermally conductive sheet, and indicator means connected with said thermally conductive sheet and selectively movable into communication with said thermally responsive substance upon removal of said shield component from said thermally conductive sheet, said indicator means when in communication with said thermally responsive substance being operably responsive to a change in state of said substance to evidence initiation of such stage change.

2. The temperature indicating device of claim 1 wherein said thermally conductive sheet is provided with a plurality of cavities in said indicator section, there being a separate deposit of said thermally responsive substance in each of said cavities, the heat seal connection of said shield component with the indicator section face portion of said thermally conductive sheet being such that the entrance to each of said cavities is encircled by said heat seal.

3. The temperature indicating device of claim 2 wherein said shield component comprises a laminate including a first layer of a material inert in respect of said thermally responsive substance and heat sealable to said thermally conductive sheet and being in contact with said thermally conductive sheet, and a second layer of a material impervious to vapor transmission therethrough overlaying said first layer and in intimate contact therewith.

4. The temperature indicating device of claim 1 wherein said thermally conductive sheet is a foil of a metal and is provided with a plurality of cavities in said indicator section, there being a separate deposit of said thermally responsive substance in each of said cavities, the heat seal connection of said shield component with the indicator section face portion of said thermally conductive sheet being such that the entrance to each of said cavities is encircled by said heat seal, said shield component comprising a laminate including a first layer of an anionic polymer heat sealed to said thermally conductive sheet and being inert in respect of said thermally responsive substance, and a second layer of a material impervious to vapor transmission therethrough overlaying said first layer and in intimate contact therewith.

5. The temperature indicating device of claim 4 wherein said thermally conductive sheet is a foil of aluminum.

6. The temperature indicating device of claim 5 wherein the first layer of said laminate is an Ionomer.

7. The temperature indicating device of claim 5 wherein the first layer of said laminate is polyethylene.

8. The temperature indicating device of claim 5 wherein said thermally responsive substance is a solid solution comprised of ortho-chloronitrobenzene and ortho-bromonitrobenzene.

9. The temperature indicating device of claim 6 wherein the second layer of said laminate is aluminum.

10. The temperature indicating device of claim 6 wherein the second layer of said laminate is a polyester.

11. The temperature indicating device of claim 6 wherein the second layer of said laminate is nylon.

12. The temperature indicating device of claim 4 wherein said shield component is a laminate strip folded upon itself along a fold line to provide a first component portion substantially coextensive with said thermally conductive sheet and a second component portion superposed on said first portion, the first component portion being heat sealed to said thermally conductive sheet, said indicator means being carried on a film support which is substantially coextensive with said thermally conductive sheet, said first and second component portions of said laminate being interposed between said thermally conductive sheet and said film support, said laminate second component portion having an extension portion thereof providing said shield component pull tab means.

13. The temperature indicating device of claim 12 wherein said indicator section face portion is a substantially planar surface, the entrance to each of said cavities lying in the plane of said face, the first component portion of said shield component being substantially flat and being in heat sealed face-to-face contact with said planar surface.

14. The temperature indicating device of claim 1 wherein said indicator means is carried on a film support substantially coextensive with said thermally conductive sheet, and another shield component removably connected with said film support and overlaying said indicator means, said other shield component embodying pull tab means for digitally peelably removing said other shield component from said film support.

15. The temperature indicating device of claim 14 wherein said film support has an adhesive face thereon, the indicator means being carried on said adhesive face, said other shield component being removably adhesively secured to said adhesive face.

16. The temperature indicating device of claim 14 wherein said film support has a face segment thereon corresponding to the indicator section face portion of said thermally conductive sheet, said indicator means being carried on said face segment, said other shield component being a material strip folded upon itself along a fold line to provide a first portion substantially coextensive with said face segment of said film support and a second portion at least coextensive with the first portion, the first portion of said other shield component being adhesively connected with said face segment, the second portion having an extension portion thereof providing said other shield component pull tab means.

17. The temperature indicating device of claim 16 wherein the indicator section of said thermally conductive sheet and the face segment on said film support comprise first longitudinal parts of the respective thermally conductive sheet and film support, the remaining longitudinal parts of each comprising handle parts for the device.

18. The temperature indicating device of claim 17 wherein the first-mentioned shield component and said other shield component are disposed such that the fold line of each is proximate the juncture of first and remaining longitudinal parts of said thermally conductive sheet and film support.

19. The temperature indicating device of claim 15 wherein said other shield component is a strip of a fluro-carbon material.

20. The temperature indicating device of claim 15 wherein said other shield component is a strip of paper having a release agent on the surfaces thereof.

21. The temperature indicating device of claim 1 wherein said indicator means is carried on a film support substantially coextensive with said thermally conductive sheet and is provided with an adhesive face, said indicator means being carried at said adhesive face, and another shield component associated with said indicator means, said other shield component comprising a material strip interposed between said first-mentioned shield component and said indicator means, said material strip having opposite face surfaces thereon, said material strip being connected at one of said faces with the first-mentioned shield component, the other of said faces juxtaposed with said indicator means and the adhesive face of said film support, said other face having a release agent coating thereon.

22. The temperature indicating device of claim 21 wherein said thermally conductive sheet is a foil of a metal, the heat seal connection of said shield component with the indicator section face portion of said thermally conductive sheet being such that the entrance to said cavity is encircled by said heat seal, said shield component comprising a laminate including a first layer of an anionic polymer, and a second layer of a material impervious to vapor transmission therethrough overlaying said first layer and in intimate contact therewith, said laminate being folded upon itself along a fold line to provide a first component portion substantially coextensive with said thermally conductive sheet and a second component portion superposed on said first portion with the first layer thereof juxtaposed with both said indicator means and the indicator section of said thermally conductive sheet, the laminate first layer first component portion being heat sealed to said thermally conductive sheet, said other shield component being heat sealed to the laminate first layer of said second portion.

23. The temperature indicating device of claim 22 wherein said other shield component comprises a strip of paper.

24. The temperature indicating device of claim 23 wherein said thermally conductive sheet is aluminum.

25. The temperature indicating device of claim 24 wherein said thermally responsive substance is solid solution comprised of ortho-chloronitrobenzene and ortho-bromonitrobenzene.

26. The temperature indicating device of claim 25 wherein said anionic polymer is an Ionomer.

27. The temperature indicating device of claim 21 wherein said release agent is a silicone.

* * * * *